(12) United States Patent
Fujikawa et al.

(10) Patent No.: US 10,843,423 B2
(45) Date of Patent: Nov. 24, 2020

(54) SPECIALLY-SHAPED EPOXY RESIN MOLDED ARTICLE, AND OPTICAL DEVICE PROVIDED WITH SAME

(71) Applicant: DAICEL CORPORATION, Osaka (JP)

(72) Inventors: Takeshi Fujikawa, Himeji (JP); Sadayuki Fukui, Himeji (JP)

(73) Assignee: DAICEL CORPORATION, Osaka (JP)

( * ) Notice: Subject to any disclaimer, the term of this patent is extended or adjusted under 35 U.S.C. 154(b) by 177 days.

(21) Appl. No.: 15/502,288

(22) PCT Filed: Aug. 4, 2015

(86) PCT No.: PCT/JP2015/072041
§ 371 (c)(1),
(2) Date: Feb. 7, 2017

(87) PCT Pub. No.: WO2016/021577
PCT Pub. Date: Feb. 11, 2016

(65) Prior Publication Data
US 2017/0232695 A1    Aug. 17, 2017

(30) Foreign Application Priority Data

Aug. 8, 2014   (JP) ................................. 2014-162669
Oct. 30, 2014  (JP) ................................. 2014-221124
Mar. 18, 2015  (JP) ................................. 2015-054459

(51) Int. Cl.
*B29D 11/00*    (2006.01)
*G02B 3/08*     (2006.01)
(Continued)

(52) U.S. Cl.
CPC ...... *B29D 11/00269* (2013.01); *B29C 39/006* (2013.01); *B29C 39/02* (2013.01);
(Continued)

(58) Field of Classification Search
CPC .............................................. B29D 11/00269
See application file for complete search history.

(56) References Cited

U.S. PATENT DOCUMENTS 6,335,079 B1      1/2002  Osawa et al.
2008/0021166 A1*  1/2008  Tong .................... C08F 220/18
                                                   525/241
(Continued)

FOREIGN PATENT DOCUMENTS

EP    3088465 A1    11/2016
EP    3211459 A1     8/2017
(Continued)

OTHER PUBLICATIONS

International Search Report for PCT/JP2015/072041(PCT/ISA/210) dated Nov. 2, 2015.
(Continued)

*Primary Examiner* — Megan McCulley
(74) *Attorney, Agent, or Firm* — Birch, Stewart, Kolasch & Birch, LLP

(57) ABSTRACT

Provided is a molded article that has such a shape as to offer a light condensing or light diffusing effect, has excellent mechanical strengths and heat resistance, and has a high thickness deviation ratio. This molded article includes a cured product of a curable composition containing an epoxy compound (A). The cured product has a flexural modulus of 2.5 GPa or more as measured in conformity with JIS K 7171:2008, except for performing measurement on a test specimen having a length of 20 mm, a width of 2.5 mm, and a thickness of 0.5 mm and at a span between specimen supports of 16 mm. The molded article has a thickness deviation ratio (thickest portion thickness to thinnest portion thickness ratio) of 5 or more and offers a light condensing or light diffusing effect. The molded article preferably has a
(Continued)

thinnest portion thickness of 0.2 mm or less. The curable composition is preferably a photocurable composition.

9 Claims, 4 Drawing Sheets

(51) Int. Cl.

| | |
|---|---|
| B29C 39/02 | (2006.01) |
| G02B 5/02 | (2006.01) |
| G02B 1/04 | (2006.01) |
| B29C 39/00 | (2006.01) |
| C08G 59/24 | (2006.01) |
| C08G 59/22 | (2006.01) |
| C08K 5/134 | (2006.01) |
| C08K 5/527 | (2006.01) |
| B29L 11/00 | (2006.01) |
| B29K 63/00 | (2006.01) |

(52) U.S. Cl.
CPC ...... *B29C 39/026* (2013.01); *B29D 11/00442* (2013.01); *C08G 59/226* (2013.01); *C08G 59/24* (2013.01); *C08K 5/1345* (2013.01); *C08K 5/527* (2013.01); *G02B 1/04* (2013.01); *G02B 1/041* (2013.01); *G02B 3/08* (2013.01); *G02B 5/02* (2013.01); *B29K 2063/00* (2013.01); *B29K 2995/0082* (2013.01); *B29L 2011/0016* (2013.01)

(56) References Cited

U.S. PATENT DOCUMENTS

| | | | |
|---|---|---|---|
| 2009/0163652 A1* | 6/2009 | Tajima | C08L 63/00 524/612 |
| 2013/0032933 A1 | 2/2013 | Fuke et al. | |
| 2013/0182997 A1* | 7/2013 | Fujiwara | G02B 6/4214 385/14 |
| 2015/0086856 A1 | 3/2015 | Tomita et al. | |
| 2015/0158971 A1 | 6/2015 | Ogane et al. | |
| 2015/0212300 A1 | 7/2015 | Kubo et al. | |
| 2015/0232620 A1 | 8/2015 | Sakane | |
| 2016/0122466 A1* | 5/2016 | Nakamura | C07C 41/16 528/418 |
| 2016/0311968 A1 | 10/2016 | Fujikawa et al. | |
| 2017/0227190 A1 | 8/2017 | Fujikawa et al. | |

FOREIGN PATENT DOCUMENTS

| | | |
|---|---|---|
| JP | 2008-257261 A | 10/2008 |
| JP | 2009-114390 A | 5/2009 |
| JP | 2012-82387 A | 4/2012 |
| JP | 2012-140607 A | 7/2012 |
| JP | 2013-212593 A | 10/2013 |
| JP | 2013-224349 A | 10/2013 |
| WO | WO 2012/133578 A1 | 10/2012 |
| WO | WO 2013/172407 A1 | 11/2013 |
| WO | WO 2014/034507 A1 | 3/2014 |
| WO | WO 2014/061648 A1 | 4/2014 |

OTHER PUBLICATIONS

Written Opinion of the International Searching Authority for PCT/JP2015/072041 (PCT/ISA/237) dated Nov. 2, 2015.
Fader et al., "Functional epoxy polymer for direct nano-imprinting of micro-optical elements", Microelectronic Engineering, vol. 110, 2013 (Available online Feb. 21, 2013), pp. 90-93.

* cited by examiner

[Fig. 1]
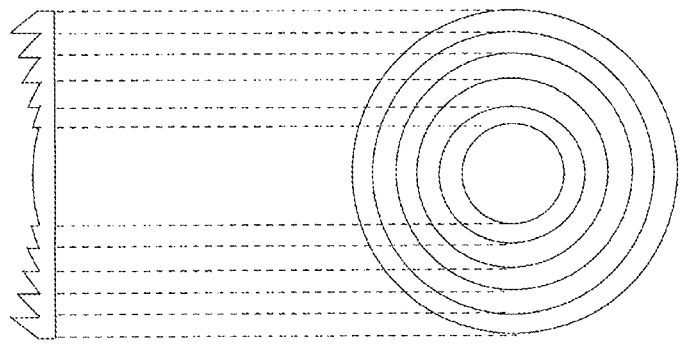
(1-a)  (1-b)
[Fig. 2]
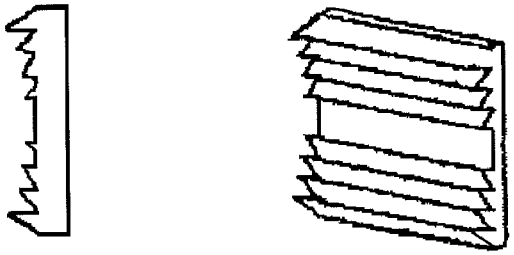
(2-a)  (2-b)
[Fig. 3]
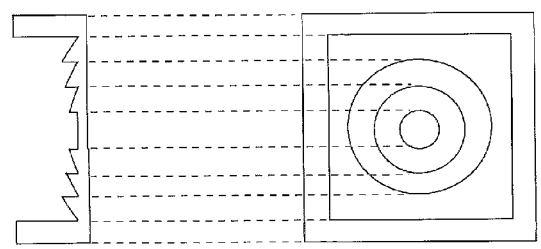
(3-a)  (3-b)

[Fig. 4]
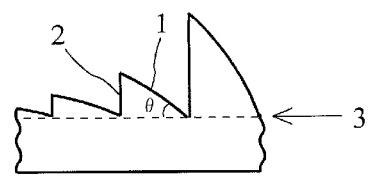

[Fig. 5]
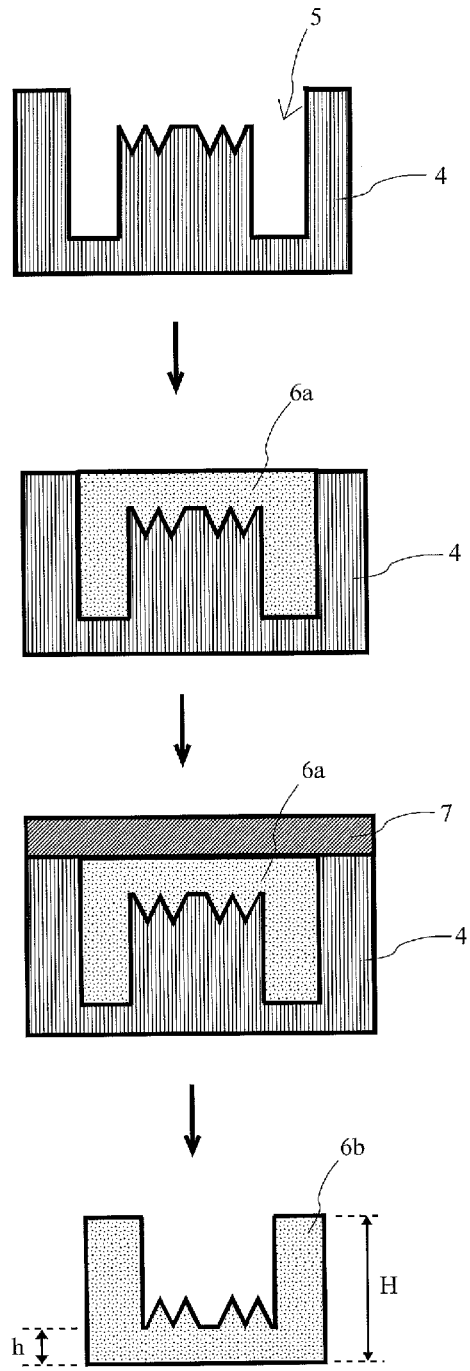

[Fig. 6]
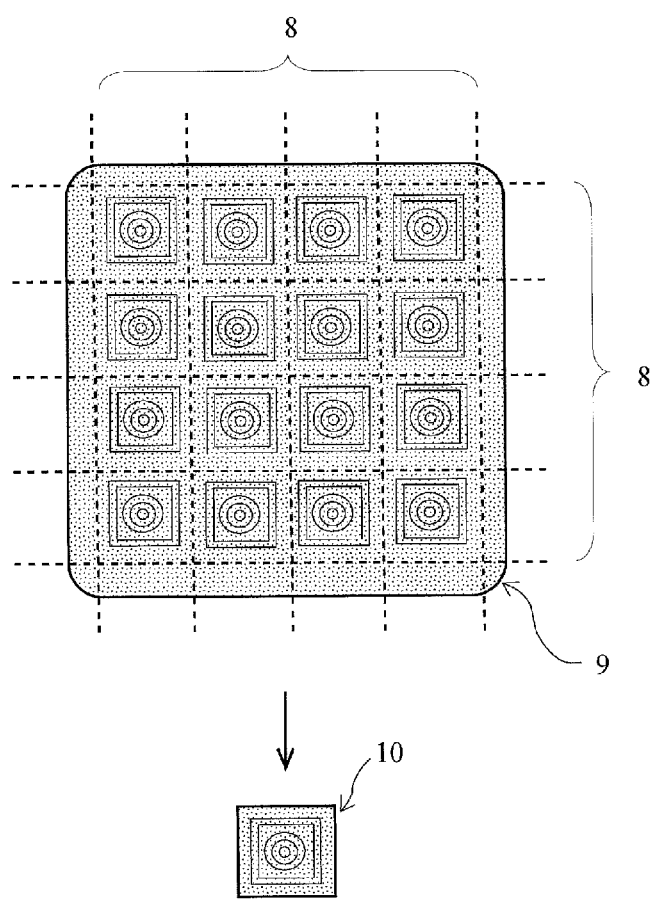

SPECIALLY-SHAPED EPOXY RESIN MOLDED ARTICLE, AND OPTICAL DEVICE PROVIDED WITH SAME

TECHNICAL FIELD

The present invention relates to epoxy resin molded articles having high thickness deviation ratios; and to optical devices including the molded articles. This application relates to Japanese Patent Application No. 2014-162669, filed Aug. 8, 2014 to Japan; Japanese Patent Application No. 2014-221124, filed Oct. 30, 2014 to Japan; and Japanese Patent Application No. 2015-054459, filed Mar. 18, 2015 to Japan, the entire contents of each of which applications are incorporated herein by reference.

BACKGROUND ART

Portable electronic devices such as cellular phones, smartphones, and tablet personal computers decrease in size and increase in functionality. Accompanied with this, members or components for use therein require smaller thickness and enhanced functionality, and optical components such as lenses require higher thickness deviation ratios.

In exemplary known methods, thermoplastic resins such as polycarbonates, poly(methyl methacrylate)s (PMMAs), and cycloolefin polymers (COPs) are subjected to injection molding to produce optical components (Patent Literature (PTL) 1 and PTL 2). Disadvantageously, however, such thermoplastic resins have low fluidity and, when used to produce molded articles having high thickness deviation ratios by injection molding, suffer from poor appearance and deterioration in mechanical strengths, because an unfilled part is formed in a thin wall portion, and/or a weld line is formed due to a lower filling rate (filling speed) in the thin wall portion as compared with a thick wall portion. Of molded articles having high thickness deviation ratios, specially-shaped molded articles such as Fresnel lenses require complicated shapes so as to offer higher light extraction efficiency. This impedes the preparation of molding molds (dies) having reversed shapes corresponding to the molded articles. In addition, such molded products derived from thermoplastic resins have poor heat resistance, are incapable of being subjected to board assembly (board-level packaging) together with other components by reflow soldering, and are disadvantageous in working efficiency. In other known methods, silicones having heat resistance are used. Disadvantageously, however, these methods suffer from high material cost and poor shape transferability.

CITATION LIST

Patent Literature

PTL 1: Japanese Unexamined Patent Application Publication (JP-A) No. 2013-212593
PTL 2: JP-A No. 2013-224349

SUMMARY OF INVENTION

Technical Problem

Accordingly, the present invention has an object to provide a molded article which has such a shape as to offer a light condensing or light diffusing effect, has mechanical strengths and heat resistance both at excellent levels, and has a high thickness deviation ratio.

The present invention has another object to provide a molded article which has such a shape as to offer a light condensing or light diffusing effect, has mechanical strengths and heat resistance both at excellent levels, has a high thickness deviation ratio, and includes a thin wall portion.

The present invention has still another object to provide a molded article which has such a shape as to offer a light condensing or light diffusing effect, has mold transferability, mechanical strengths, and heat resistance at excellent levels, has a high thickness deviation ratio, and includes a thin wall portion.

The present invention has yet another object to provide a method for producing the molded articles.

The present invention has another object to provide an optical device including any of the molded articles.

Solution to Problem

After intensive investigations to achieve the objects, the inventors of the present invention found that a curable composition containing an epoxy compound (A), when subjected to cast molding, gives a molded article which has such a shape as to offer a light condensing or light diffusing effect, has mold transferability, mechanical strengths, and heat resistance at excellent levels, and has a high thickness deviation ratio. The present invention has been made on the basis of these findings.

Specifically, the present invention provides, in an embodiment, a molded article including a cure product of a curable composition containing an epoxy compound (A). The cured product has a flexural modulus of 2.5 GPa or more as measured in conformity with JIS K 7171:2008, except performing measurement on a test specimen having a length of 20 mm, a width of 2.5 mm, and a thickness of 0.5 mm at a span between specimen supports of 16 mm. The molded article has a thickness deviation ratio (thickest portion thickness to thinnest portion thickness ratio) of 5 or more. The molded article offers a light condensing or light diffusing effect.

The molded article may have a thickness at the thinnest portion of 0.2 mm or less.

In the molded article, the epoxy compound (A) may contain a compound represented by Formula (a):

[Chem. 1]

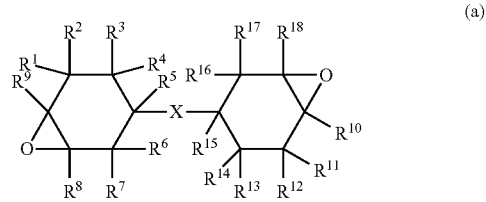

(a)

where $R^1$ to $R^{18}$ are each, identically or differently, selected from hydrogen, halogen, a hydrocarbon group optionally containing oxygen or halogen, and optionally substituted alkoxy; and X is selected from a single bond and a linkage group.

In the molded article, the compound represented by Formula (a) contained in the epoxy compound (A) may include a compound devoid of ester bonds.

In the molded article, the curable composition may further contain an oxetane compound (B) and a cationic-polymerization initiator (C), in addition to the epoxy compound (A).

In the molded article, the cationic-polymerization initiator (C) may include a cationic photoinitiator.

In the molded article, the curable composition may further contain an antioxidant (D).

The molded article, which is a molded article offering a light condensing or light diffusing effect, may be a Fresnel lens.

The present invention also provides, in another embodiment, a method for producing a molded article. The method includes subjecting a curable composition containing an epoxy compound (A) to cast molding to yield the molded article.

The method for producing a molded article may include the steps 1, 2, and 3 as follows. In the step 1, a photocurable composition as the curable composition containing the epoxy compound (A) is charged into a transparent array mold. In the step 2, the photocurable composition is irradiated with light to give an array of molded articles. In the step 3, the array of molded articles is separated into individual molded articles.

In the method for producing a molded article, the light irradiation may be performed using a UV-LED (with a wavelength of 350 to 450 nm).

In the method for producing a molded article, the light irradiation may be performed at an integrated irradiance of 5000 mJ/cm$^2$ or less.

The present invention also provides, in yet another embodiment, an optical device including the molded article.

Specifically, the present invention relates to the followings.

(1) The present invention relates to a molded article including a cure product of a curable composition containing an epoxy compound (A). The cured product has a flexural modulus of 2.5 GPa or more as measured in conformity with JIS K 7171:2008, except performing measurement on a test specimen having a length of 20 mm, a width of 2.5 mm, and a thickness of 0.5 mm at a span between specimen supports of 16 mm. The molded article has a thickness deviation ratio (thickest portion thickness to thinnest portion thickness ratio) of 5 or more. The molded article offers a light condensing or light diffusing effect.

(2) The molded article according to (1) may have a thickness at the thinnest portion of 0.2 mm or less.

(3) The molded article according to one of (1) and (2) may have a thickness at the thickest portion of 0.5 mm or more.

(4) In the molded article according to any one of (1) to (3), the epoxy compound (A) may contain a compound represented by Formula (a).

(5) In the molded article according to (4), the compound represented by Formula (a) contained in the epoxy compound (A) may include a compound devoid of ester bonds.

(6) In the molded article according to (4), the compound represented by Formula (a) may include at least one compound selected from (3,4,3',4'-diepoxy)bicyclohexyl, bis(3,4-epoxycyclohexylmethyl) ether, and 3,4-epoxycyclohexylmethyl (3,4-epoxy) cyclohexanecarboxylate.

(7) In the molded article according to one of (4) and (5), the compound represented by Formula (a) may include at least one of (3,4,3',4'-diepoxy)bicyclohexyl and bis(3,4-epoxycyclohexylmethyl) ether.

(8) In the molded article according to any one of (4) to (7), the epoxy compound (A) may further contain a glycidyl ether epoxy compound in addition to the compound represented by Formula (a).

(9) In the molded article according to any one of (1) to (8), the curable composition may contain the epoxy compound (A) in a content of 30 to 90 weight percent of the total weight of all curable compounds contained in the curable composition.

(10) In the molded article according to any one of (1) to (9), the curable composition may further contain an oxetane compound (B) and a cationic-polymerization initiator (C), in addition to the epoxy compound (A).

(11) In the molded article according to (10), the oxetane compound (B) may include at least one compound selected from 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-((2-perfluorobutyl)ethoxy)oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and compounds represented by Formulae (b-1) to (b-15).

(12) In the molded article according to one of (10) and (11), the curable composition may contain the oxetane compound (B) in a content of 5 to 40 weight percent of the total weight of all curable compounds contained in the curable composition.

(13) In the molded article according to any one of (10) to (12), the cationic-polymerization initiator (C) may be selected from cationic photoinitiators.

(14) In the molded article according to any one of (10) to (13), the cationic-polymerization initiator (C) may be selected from sulfonium salt compounds.

(15) In the molded article according to any one of (10) to (14), the cationic-polymerization initiator (C) may be selected from compounds having, as an anionic moiety, $SbF_6^-$ or $[(Y)_sB(Phf)_{4-s}]^-$ where Y is selected from phenyl and biphenylyl; Phf represents a phenyl with at least one selected from perfluoroalkyl, perfluoroalkoxy, and halogen replacing at least one of hydrogen atoms; and s represents an integer of 0 to 3.

(16) In the molded article according to any one of (10) to (15), the curable composition may contain the cationic-polymerization initiator (C) in a proportion of 0.1 to 10.0 parts by weight per 100 parts by weight of all curable compounds contained in the curable composition.

(17) In the molded article according to any one of (1) to (16), the curable composition may further contain an antioxidant (D).

(18) In the molded article according to (17), the antioxidant (D) may include at least one of a phenolic antioxidant and a phosphorus antioxidant.

(19) In the molded article according to one of (17) and (18), the curable composition may contain the antioxidant (D) in a proportion of 0.1 to 10.0 parts by weight per 100 parts by weight of all curable compounds contained in the curable composition.

(20) The molded article according to any one of (1) to (19), which is a molded article offering a light condensing or light diffusing effect, may be a lens or a prism.

(21) The molded article according to any one of (1) to (19), which is a molded article offering a light condensing or light diffusing effect, may be a Fresnel lens.

(22) The present invention also relates to a method for producing a molded article. The method includes subjecting a curable composition containing an epoxy compound (A) to cast molding to yield the molded article according to any one of (1) to (21).

(23) The method according to (22) for producing a molded article may include steps 1, 2, and 3 as follows. In the step 1, a photocurable composition as the curable composition containing the epoxy compound (A) is charged into a transparent array mold. In the step 2, the photocurable composition is irradiated with light to give an array of molded articles. In the step 3, the array of molded articles is separated into individual molded articles.

(24) In the method according to (23) for producing a molded article, the light irradiation is performed using a UV-LED (with a wavelength of 350 to 450 nm).

(25) In the method according to one of (23) and (24) for producing a molded article, the light irradiation is performed at an integrated irradiance of 5000 mJ/cm$^2$ or less.

(26) The present invention also relates to an optical device including the molded article according to any one of (1) to (21).

(27) The optical device according to (26) may be selected from a portable electronic device and an on-vehicle electronic device.

Advantageous Effects of Invention

The molded article according to the present invention is a molded article having such a shape as to offer a light condensing or light diffusing effect. The molded article has mold transferability, mechanical strengths, and heat resistance at excellent levels and has a thickness deviation ratio of 5 or more. The molded article is thereby ready for decrease in size and increase in functionality of an optical device including the molded article. The molded article according to the present invention has excellent heat resistance and can be subjected, together with other components, to board assembly (board level packaging) by reflow soldering (in particular, by lead-free soldering) without the need for another process for assembly. This enables the production of an optical device including the molded article with excellent working efficiency. In addition, the molded article is usable even in on-vehicle electronic devices, which require heat resistance.

BRIEF DESCRIPTION OF DRAWINGS

FIGS. 1-a and 1-b are a schematic cross-sectional view and a top view, respectively, of a molded article according to an embodiment of the present invention;

FIGS. 2-a and 2-b are a schematic cross-sectional view and a schematic perspective view, respectively, of a molded article according to another embodiment of the present invention;

FIGS. 3-a and 3-b are a schematic cross-sectional view and a top view, respectively, of a molded article according to yet another embodiment of the present invention;

FIG. 4 is a schematic cross-sectional view of a Fresnel lens and schematically illustrates a lens surface 1, a non-lens surface 2, and an angle (θ) formed between the lens surface 1 and a reference plane 3;

FIG. 5 is a schematic diagram illustrating a method for producing a molded article 6b according to an embodiment, where the molded article 6b has a thickest portion thickness H and a thinnest portion thickness h; and FIG. 6 is a schematic diagram illustrating how to give a molded article 10 by cutting an array 9 of molded articles along cutting lines 8 into individual molded articles, where the array has been obtained using an array mold.

DESCRIPTION OF EMBODIMENTS

Curable Composition
Epoxy Compound (A)

The curable composition for use in the present invention contains an epoxy compound, which is a curable compound (in particular, a cationically curable compound).

Non-limiting examples of the epoxy compound include aromatic glycidyl ether epoxy compounds such as bisphenol-A diglycidyl ether and bisphenol-F diglycidyl ether; alicyclic glycidyl ether epoxy compounds such as hydrogenated bisphenol-A diglycidyl ether and hydrogenated bisphenol-F diglycidyl ether; aliphatic glycidyl ether epoxy compounds; glycidyl ester epoxy compounds; glycidylamine epoxy compounds; cycloaliphatic epoxy compounds; and epoxy-modified siloxane compounds. The curable composition may contain each of different epoxy compounds alone or in combination.

The curable composition for use in the present invention preferably contains, in particular, an cycloaliphatic epoxy compound so as to give a cured product having excellent mechanical strengths (such as a flexural modulus of 2.5 GPa or more). As used herein, the term "cycloaliphatic epoxy compound" refers to a compound containing a cycloaliphatic epoxy group (such as a cyclohexene oxide group), where the cycloaliphatic epoxy group refers to a group containing one oxygen atom bonded in a triangular arrangement to two adjacent carbon atoms constituting an aliphatic ring.

Non-limiting examples of the cycloaliphatic epoxy compound include compounds represented by Formula (a):

[Chem. 2]

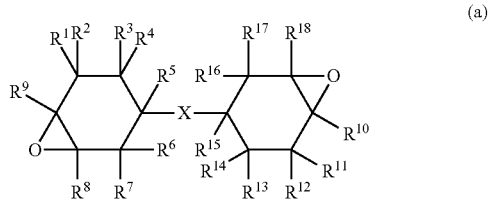

(a)

In Formula (a), $R^1$ to $R^{18}$ are each, identically or differently, selected from hydrogen, halogen, a hydrocarbon group optionally containing oxygen or halogen, and optionally substituted alkoxy; and X is selected from a single bond and a linkage group.

Non-limiting examples of the halogen as $R^1$ to $R^{18}$ include fluorine, chlorine, bromine, and iodine.

The hydrocarbon group as $R^1$ to $R^{18}$ is preferably selected from $C_1$-$C_{20}$ hydrocarbon groups. Such hydrocarbon groups include aliphatic hydrocarbon groups, alicyclic hydrocarbon groups, aromatic hydrocarbon groups, and groups each including two or more of them bonded to each other.

The aliphatic hydrocarbon groups are preferably $C_1$-$C_{20}$ aliphatic hydrocarbon groups, non-limiting examples of which include $C_1$-$C_{20}$ alkyls such as methyl, ethyl, propyl, isopropyl, butyl, hexyl, octyl, isooctyl, decyl, and dodecyl, of which $C_1$-$C_{10}$ alkyls are preferred, and $C_1$-$C_4$ alkyls are particularly preferred; $C_2$-$C_{20}$ alkenyls such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which $C_2$-$C_{10}$ alkenyls are preferred, and $C_2$-$C_4$ alkenyls are particularly preferred; and $C_2$-$C_{20}$ alkynyls such as ethynyl and propynyl, of which $C_2$-$C_{10}$ alkynyls are preferred, and $C_2$-$C_4$ alkynyls are particularly preferred.

The alicyclic hydrocarbon groups are preferably $C_3$-$C_{15}$ alicyclic hydrocarbon groups, non-limiting examples of which include $C_3$-$C_{12}$ cycloalkyls such as cyclopropyl, cyclobutyl, cyclopentyl, cyclohexyl, and cyclododecyl; $C_3$-$C_{12}$ cycloalkenyls such as cyclohexenyl; and $C_4$-$C_{15}$ bridged hydrocarbon groups such as bicycloheptyl and bicycloheptenyl.

The aromatic hydrocarbon groups are preferably $C_6$-$C_{14}$ aromatic hydrocarbon groups, which are exemplified by, but not limited to, $C_6$-$C_{14}$ aryls such as phenyl and naphthyl, of which $C_6$-$C_{10}$ aryls are preferred.

Of the groups each including two or more of the above-mentioned aliphatic hydrocarbon groups, alicyclic hydrocarbon groups, and aromatic hydrocarbon groups bonded to each other, non-limiting examples of groups each including an aliphatic hydrocarbon group and an alicyclic hydrocarbon group bonded to each other include $C_3$-$C_{12}$ cycloalkyl-substituted $C_1$-$C_{20}$ alkyls such as cyclohexylmethyl; and $C_1$-$C_{20}$ alkyl-substituted $C_3$-$C_{12}$ cycloalkyls such as methylcyclohexyl. Non-limiting examples of groups each including an aliphatic hydrocarbon group and an aromatic hydrocarbon group bonded to each other include $C_7$-$C_{18}$ aralkyls such as benzyl and phenethyl, of which $C_7$-$C_{10}$ aralkyls are typified; $C_6$-$C_{14}$ aryl-substituted $C_2$-$C_{20}$ alkenyls such as cinnamyl; $C_1$-$C_{20}$ alkyl-substituted $C_6$-$C_{14}$ aryls such as tolyl; and $C_2$-$C_{20}$ alkenyl-substituted $C_6$-$C_{14}$ aryls such as styryl.

Non-limiting examples of the hydrocarbon group optionally containing oxygen or halogen, as $R^1$ to $R^{18}$, include groups resulting from replacing at least one hydrogen atom each in the above-mentioned hydrocarbon groups with an oxygen-containing group or a halogen-containing group. Non-limiting examples of the oxygen-containing group include hydroxy; hydroperoxy; $C_1$-$C_{10}$ alkoxys such as methoxy, ethoxy, propoxy, isopropyloxy, butoxy, and isobutyloxy; $C_2$-$C_{10}$ alkenyloxys such as allyloxy; tolyloxy, naphthyloxy, and other $C_6$-$C_{14}$ aryloxys optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxys such as benzyloxy and phenethyloxy; $C_1$-$C_{10}$ acyloxys such as acetyloxy, propionyloxy, (meth)acryloyloxy, and benzoyloxy; $C_1$-$C_{10}$ alkoxy-carbonyls such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxy-carbonyls optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxy-carbonyls such as benzyloxycarbonyl; epoxy-containing groups such as glycidyloxy; oxetanyl-containing groups such as ethyloxetanyloxy; $C_1$-$C_{10}$ acyls such as acetyl, propionyl, and benzoyl; isocyanato; sulfo; carbamoyl; oxo; and groups each including two or more of them bonded to each other through a single bond or a linkage group such as a $C_1$-$C_{10}$ alkylene group. Non-limiting examples of the halogen-containing group include fluorine, chlorine, bromine, and iodine.

Non-limiting examples of the alkoxy as $R^1$ to $R^{18}$ include $C_1$-$C_{10}$ alkoxys such as methoxy, ethoxy, propoxy, isopropyloxy, butoxy, and isobutyloxy.

Non-limiting examples of the substituents which the alkoxy may have include halogens, hydroxy, $C_1$-$C_{10}$ alkoxys, $C_2$-$C_{10}$ alkenyloxys, $C_6$-$C_{14}$ aryloxys, $C_1$-$C_{10}$ acyloxys, mercapto, $C_1$-$C_{10}$ alkylthios, $C_2$-$C_{10}$ alkenylthios, $C_6$-$C_{14}$ arylthios, $C_7$-$C_{18}$ aralkylthios, carboxy, $C_1$-$C_{10}$ alkoxy-carbonyls, $C_6$-$C_{14}$ aryloxy-carbonyls, $C_7$-$C_{18}$ aralkyloxy-carbonyls, amino, mono- or di-($C_1$-$C_{10}$ alkyl)aminos, $C_1$-$C_{10}$ acylaminos, epoxy-containing groups, oxetanyl-containing groups, $C_1$-$C_{10}$ acyls, oxo, and groups each including two or more of them bonded to each other through a single bond or a linkage group such as a $C_1$-$C_{10}$ alkylene group.

In particular, $R^1$ to $R^{18}$ are preferably hydrogens.

X in Formula (a) is selected from a single bond and a linkage group (a divalent group having one or more atoms). Non-limiting examples of the linkage group include divalent hydrocarbon groups, alkenylene groups with part or all of carbon-carbon double bond(s) being epoxidized, carbonyl, ether bond, ester bond, amido, and groups each including two or more of them linked to each other.

Non-limiting examples of the divalent hydrocarbon groups include linear or branched $C_1$-$C_{18}$ alkylene groups such as methylene, methylmethylene, dimethylmethylene, ethylene, propylene, and trimethylene groups, of which linear or branched $C_1$-$C_3$ alkylene groups are preferred; and $C_3$-$C_{12}$ cycloalkylene groups and $C_3$-$C_{12}$ cycloalkylidene groups, such as 1,2-cyclopentylene, 1,3-cyclopentylene, cyclopentylidene, 1,2-cyclohexylene, 1,3-cyclohexylene, 1,4-cyclohexylene, and cyclohexylidene groups, of which $C_3$-$C_6$ cycloalkylene groups and $C_3$-$C_6$ cycloalkylidene groups are preferred.

The alkenylene groups with part or all of carbon-carbon double bond(s) being epoxidized are hereinafter also referred to as "epoxidized alkenylene groups". Non-limiting examples of the alkenylene moieties in the epoxidized alkenylene groups include $C_2$-$C_8$ linear or branched alkenylene groups such as vinylene, propenylene, 1-butenylene, 2-butenylene, butadienylene, pentenylene, hexenylene, heptenylene, and octenylene groups. In particular, of the epoxidized alkenylene groups, preferred are alkenylene groups with all of carbon-carbon double bond(s) being epoxidized, and more preferred are $C_2$-$C_4$ alkenylene groups with all of carbon-carbon double bond(s) being epoxidized.

Representative, but non-limiting examples of the compounds represented by Formula (a) include 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohexyl)propane, and 1,2-bis(3,4-epoxycyclohex-1-yl)ethane. The curable composition may contain each of them alone or in combination.

Among them, the curable composition for use in the present invention preferably contains at least one compound selected from (3,4,3',4'-diepoxy)bicyclohexyl, bis(3,4-epoxycyclohexylmethyl) ether, and 3,4-epoxycyclohexylmethyl (3,4-epoxy)cyclohexanecarboxylate. This is preferred to give a cured product having excellent curability. In particular, the curable composition preferably contains at least one of compounds that are represented by Formula (a) and are devoid of ester bonds (e.g., at least one of (3,4,3',4'-diepoxy)bicyclohexyl and bis(3,4-epoxycyclohexylmethyl) ether). This is preferred because compounds of this category offer particularly excellent curability, and the curable composition, when containing at least one of these compounds, can give a cured product having excellent curability while using the cationic-polymerization initiator (C) in a smaller amount, where the resulting cured product has both excellent curability and excellent transparency.

The epoxy compound (A) may further contain one or more other epoxy compounds in addition to the cycloaliphatic epoxy compound or compounds. The epoxy compound (A) preferably contains any of glycidyl ether epoxy compounds (in particular, at least one of aromatic glycidyl ether epoxy compounds and alicyclic glycidyl ether epoxy compounds). This is preferred for adjusting refractive index.

The curable composition may contain the epoxy compound (A) in a content of typically 30 to 90 weight percent, preferably 50 to 90 weight percent, and particularly preferably 60 to 85 weight percent, of the total weight (100 weight percent) of all curable compounds contained in the curable composition. When the curable composition contains two or more different epoxy compounds (A), the term "content" refers to the total content of them. The curable composition, when containing the component (A) in a content less than the range, tends to cause the cured product to have lower strengths. In contrast, the curable composition, when containing the component (A) in a content greater than the range, tends to offer lower curability.

The curable composition may contain the cycloaliphatic epoxy compound in a content of typically 30 to 80 weight percent, preferably 30 to 70 weight percent, and particularly preferably 40 to 60 weight percent, of the total weight (100 weight percent) of all curable compounds contained in the curable composition. When the curable composition contains two or more different compounds of this category, the term "content" refers to the total content of them. The curable composition, if containing the cycloaliphatic epoxy compound in a content less than the range, tends to offer lower curability. In contrast, the curable composition, if containing the cycloaliphatic epoxy compound in a content greater than the range, tends to cause the cured product to be fragile.

Oxetane Compound (B)

The curable composition for use in the present invention may further contain one or more other curable compounds (in particular, cationically curable compounds) in addition to the epoxy compound (A), and preferably further contains one or more oxetane compounds for still better curability.

The oxetane compounds are represented typically by Formula (b):

[Chem. 3]

(b)

where $R^a$ represents a monovalent organic group; $R^b$ is selected from hydrogen and ethyl; and m represents an integer of 0 or more.

The monovalent organic group as $R^a$ includes monovalent hydrocarbon groups, monovalent heterocyclic groups, substituted oxycarbonyls (such as alkoxycarbonyls, aryloxycarbonyls, aralkyloxycarbonyls, and cycloalkyloxycarbonyls), substituted carbamoyls (such as N-alkylcarbamoyl and N-arylcarbamoyl), acyls (exemplified by aliphatic acyls such as acetyl; and aromatic acyls such as benzoyl), and monovalent groups each including two or more of them bonded to each other through a single bond or a linkage group.

Non-limiting examples of the monovalent hydrocarbon groups are as with $R^1$ to $R^{18}$ in Formula (a).

The monovalent hydrocarbon groups may each have one or more of various substituents. Non-limiting examples of the substituents include halogens, oxo, hydroxy, substituted oxys (such as alkoxys, aryloxys, aralkyloxys, and acyloxys), carboxy, substituted oxycarbonyls (such as alkoxycarbonyls, aryloxycarbonyls, and aralkyloxycarbonyls), substituted or unsubstituted carbamoyls, cyano, nitro, substituted or unsubstituted aminos, sulfo, and heterocyclic groups. The hydroxy and carboxy may each independently be protected with a protecting group commonly used in the field of organic synthesis.

Non-limiting examples of heterocyclic rings constituting the heterocyclic groups include 3- to 10-membered rings each containing a carbon atom and at least one heteroatom (such as oxygen, sulfur, or nitrogen) as ring-constituting atoms, of which 4- to 6-membered rings are preferred; and fused rings derived from these heterocyclic rings. Specific, but non-limiting examples of such heterocyclic rings include oxygen-containing heterocyclic rings, sulfur-containing heterocyclic rings, and nitrogen-containing heterocyclic rings, where oxygen, sulfur, and nitrogen are heteroatoms. Non-limiting examples of the oxygen-containing heterocyclic rings include 4-membered rings such as oxetane ring; 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocyclic rings include 5-membered rings such as thiophene, thiazole, isothiazole, and thiadiazole rings; 6-membered rings such as 4-oxo-4H-thiopyran ring; and fused rings such as benzothiophene ring. Non-limiting examples of the nitrogen-containing heterocyclic rings include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. Non-limiting examples of the monovalent heterocyclic groups include groups resulting from removing one hydrogen atom each from the structural formulae of the above-mentioned heterocyclic rings.

The heterocyclic groups may have one or more substituents. Non-limiting examples of the substituents include the substituents which the hydrocarbon groups may have; as well as alkyls (such as methyl, ethyl, and other $C_1$-$C_4$ alkyls), cycloalkyls (such as $C_3$-$C_{12}$ cycloalkyls), and aryls (such as phenyl, naphthyl, and other $C_6$-$C_{14}$ aryls).

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of them linked to each other.

Non-limiting examples of the compounds represented by Formula (b) include 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-[(2-perfluorobutyl)ethoxy]oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and compounds represented by Formulae (b-1) to (b-15):

[Chem. 4]

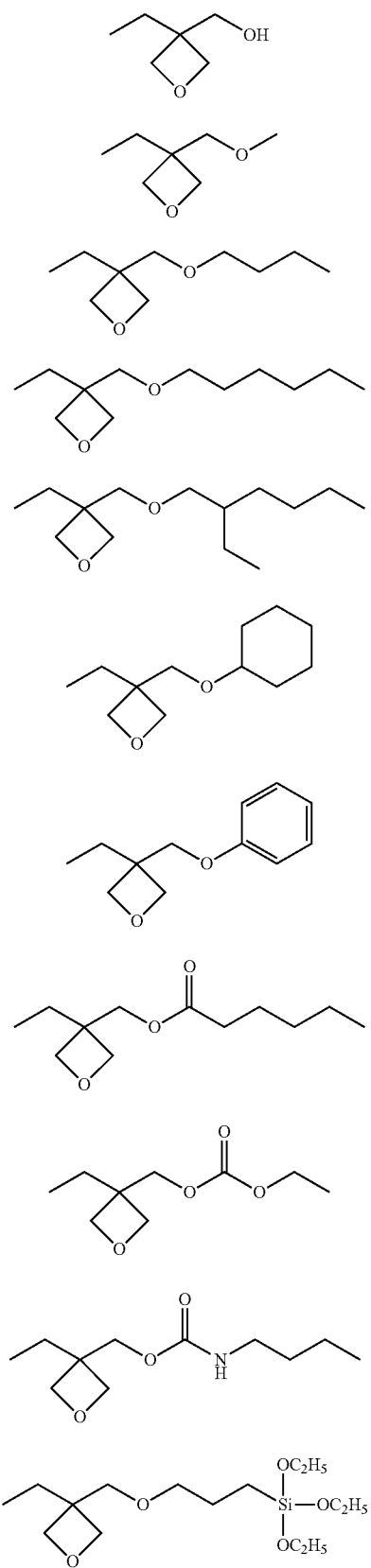
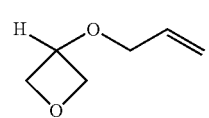

(b-1)
(b-2)
(b-3)
(b-4)
(b-5)
(b-6)
(b-7)
(b-8)
(b-9)
(b-10)
(b-11)
(b-12)
(b-13)
(b-14)
(b-15)

n = 1~3

The oxetane compound or compounds for use herein may also be selected from commercial products such as ARON OXETANE OXT-101, ARON OXETANE OXT-121, ARON OXETANE OXT-212, ARON OXETANE OXT-211, ARON OXETANE OXT-213, ARON OXETANE OXT-221, and ARON OXETANE OXT-610 (each available from Toagosei Co., Ltd.).

The curable composition may contain the oxetane compound in a content of typically 5 to 40 weight percent, preferably 5 to 30 weight percent, and particularly preferably 10 to 30 weight percent, of the total weight (100 weight percent) of all curable compounds contained in the curable composition. When the curable composition contains two or more different compounds of this category, the term "content" refers to the total content of them. The curable composition, when containing the oxetane compound in a content within the range, advantageously effectively allows the cured product to maintain strengths and to still have better curability.

Other Curable Compounds

The curable composition for use in the present invention may further contain other curable compounds (such as well-known or common cationically curable compounds and radically curable compounds) than the epoxy compounds (A) and the oxetane compounds (B). However, the curable composition may contain such other curable compound in a content of typically 30 weight percent or less, preferably 20 weight percent or less, particularly preferably 10 weight percent or less, and most preferably 5 weight percent or less, of the total weight (100 weight percent) of all curable compounds contained in the curable composition. When the curable composition contains two or more different compounds of this category, the term "content" refers to the total content of them. The curable composition, if containing the other curable compound in a content greater than the range, tends to less offer the advantageous effects of the present invention.

Cationic-Polymerization Initiator (C)

The curable composition preferably contains a cationic-polymerization initiator. Such cationic-polymerization initiators include cationic photoinitiators and cationic thermal initiators.

The cationic photoinitiators are compounds that generate acids upon light irradiation to initiate curing reactions of cationically curable compounds contained in the curable composition. The cationic photoinitiators each include a cationic moiety which absorbs light; and an anionic moiety which serves as an acid source. The curable composition may contain each of different cationic photoinitiators alone or in combination.

Non-limiting examples of the cationic photoinitiators for use in the present invention include diazonium salt compounds, iodonium salt compounds, sulfonium salt compounds, phosphonium salt compounds, selenium salt compounds, oxonium salt compounds, ammonium salt compounds, and bromine salt compounds.

Among them, sulfonium salt compounds are preferably used in the present invention to form a cured product having excellent curability. Non-limiting examples of the cationic moieties of the sulfonium salt compounds include arylsulfonium ions such as (4-hydroxyphenyl)methylbenzylsulfonium ion, triphenylsulfonium ion, diphenyl[4-(phenylthio)phenyl]sulfonium ion, 4-(4-biphenylylthio)phenyl-4-biphenylylphenylsulfonium ion, and tri-p-tolylsulfonium ion, of which triarylsulfonium ions are typified.

Non-limiting examples of the anionic moieties of the cationic photoinitiators include $[(Y)_sB(Phf)_{4-s}]^-$ (where Y is selected from phenyl and biphenylyl; Phf represents a phenyl with at least one selected from perfluoroalkyls, perfluoroalkoxys, and halogens replacing at least one hydrogen atom; and s represents an integer of 0 to 3), $BF_4^-$, $[(Rf)_tPF_{6-t}]^-$ (where Rf represents an alkyl with fluorine atom(s) replacing 80% or more of hydrogen atoms; and t represents an integer of 0 to 5), $AsF_6^-$, $SbF_6^-$, and $SbF_5OH^-$. In particular, cationic photoinitiators including $SbF_6^-$ or $[(Y)_sB(Phf)_{4-s}]$ as the anionic moiety are preferred in the present invention. These are preferred because of having high activity as initiators and giving a cured product having high curability and excellent heat resistance.

Non-limiting examples of the cationic photoinitiators for use in the present invention include (4-hydroxyphenyl)methylbenzylsulfonium tetrakis(pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanthonylthio)phenyl]phenyl-2-thioxanthonylsulfonium phenyltris(pentafluorophenyl)borate, as well as commercial products available typically under the trade names of: CYRACURE UVI-6970, CYRACURE UVI-6974, CYRACURE UVI-6990, and CYRACURE UVI-950 (each from Union Carbide Corporation, U.S.A.), Irgacure 250, Irgacure 261, and Irgacure 264 (each from BASF SE), CG-24-61 (from Ciba Geigy Ltd.), OPTOMER SP-150, OPTOMER SP-151, OPTOMER SP-170, and OPTOMER SP-171 (each from ADEKA CORPORATION), DAICAT II (from Daicel Corporation), UVAC 1590 and UVAC 1591 (each from DAICEL-CYTEC Company, Ltd.), CI-2064, CI-2639, CI-2624, CI-2481, CI-2734, CI-2855, CI-2823, CI-2758, and CIT-1682 (each from Nippon Soda Co., Ltd.), PI-2074 (from Rhodia; toluylcumyliodonium tetrakis(pentafluorophenyl) borate), FFC509 (from 3M Company), BBI-102, BBI-101, BBI-103, MPI-103, TPS-103, MDS-103, DTS-103, NAT-103, and NDS-103 (each from Midori Kagaku Co., Ltd.), CD-1010, CD-1011, and CD-1012 (each from Sartomer Company, Inc., U.S.A.), and CPI-100P and CPI-101A (each from San-Apro Ltd.).

The cationic thermal initiators are compounds that generate acids upon heat treatment to initiate curing reactions of cationically curable compounds contained in the curable composition. The cationic thermal initiators each include a cationic moiety which absorbs heat; and an anionic moiety which serves as an acid source. The curable composition may contain each of different cationic thermal initiators alone or in combination.

Exemplary cationic thermal initiators for use in the present invention include, but are not limited to, iodonium salt compounds and sulfonium salt compounds.

Non-limiting examples of the cationic moieties of the cationic thermal initiators include monoarylsulfonium ions such as 4-hydroxyphenyl-methyl-benzylsulfonium ion, 4-hydroxyphenyl-methyl-(2-methylbenzyl)sulfonium ion, 4-hydroxyphenyl-methyl-1-naphthylmethylsulfonium ion, and p-methoxycarbonyloxyphenyl-benzyl-methylsulfonium ion.

Non-limiting examples of the anionic moieties of the cationic thermal initiators are as with the anionic moieties of the cationic photoinitiators.

Non-limiting examples of the cationic thermal initiators include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

The curable composition may contain the cationic-polymerization initiator in a proportion of typically 0.1 to 10.0 parts by weight, preferably 0.1 to 5.0 parts by weight, particularly preferably 0.2 to 3.0 parts by weight, and most preferably 0.2 part by weight to less than 1.0 part by weight, per 100 parts by weight of curable compounds (in particular, cationically curable compounds) contained in the curable composition. When the curable composition contains two or more different compounds of this category, the term "proportion" refers to the total proportion of them. The curable composition, if containing the cationic-polymerization initiator in a proportion less than the range, tends to offer lower curability. In contrast, the curable composition, if containing the cationic-polymerization initiator in a proportion greater than the range, tends to cause the cured product to be readily colored.

In particular, the curable composition preferably contains a cationic photoinitiator, namely, the curable composition is preferably a photocurable composition, for excellent storage stability.

Other Components

The curable composition for use in the present invention may further contain any other component than the epoxy compounds (A), the oxetane compounds (B), and the cationic-polymerization initiators (C), within ranges not adversely affecting the advantageous effects of the present invention. Non-limiting examples of the other components include antioxidants, photosensitizers, antifoaming agents, leveling agents, coupling agents, surfactants, flame retardants, ultraviolet absorbers, and colorants. The curable composition may contain each of different components of each category alone or in combination.

Among them, the curable composition for use in the present invention preferably contains an antioxidant (D) for still better heat resistance of the resulting cured product.

Examples of the antioxidant include phenolic antioxidants, phosphorus antioxidants, thio ester antioxidants, and amine antioxidants. The curable composition for use in the present invention preferably contains at least one of a phenolic antioxidant and a phosphorus antioxidant. This is preferred so as to allow the resulting cured product to have still better heat resistance.

Non-limiting examples of the phenolic antioxidant include pentaerythritol tetrakis[3-(3,5-di-t-butylhydroxyphenyl)propionate], thiodiethylene bis[3-(3,5-di-t-butyl-4-hydroxyphenyl)propionate], octadecyl 3-(3,5-di-t-butyl-4-hydroxyphenyl)propionate, N,N'-hexamethylene-bis[3-(3,5-di-t-butyl-4-hydroxyphenyl)propionamide], octyl 3-(4-hydroxy-3,5-diisopropylphenyl)propionate, 1,3,5-tris(4-hydroxy-3,5-di-t-butylbenzyl)-2,4,6-trimethylbenzene, 2,4-bis(dodecylthiomethyl)-6-methylphenol, and calcium bis[3,5-di(t-butyl)-4-hydroxybenzyl(ethoxy)phosphinate]. The phenolic antioxidant for use in the present invention may be selected from commercial products available typically under the trade names of: Irganox 1010, Irganox 1035, Irganox 1076, Irganox 1098, Irganox 1135, Irganox 1330, Irganox 1726, and Irganox 1425WL (each from BASF SE).

Non-limiting examples of the phosphorus antioxidant include 3,9-bis(octadecyloxy)-2,4,8,10-tetraoxa-3,9-diphosphaspiro[5.5]undecane, 3,9-bis(2,6-di-t-butylmethylphenoxy)-2,4,8,10-tetraoxa-3,9-diphosphaspiro[5.5]undecane, 2,2'-methylenebis(4,6-di-t-butylphenyl)-2-ethylhexyl phosphite, and tris(2,4-di-t-butylphenyl) phosphite. The phosphorus antioxidant for use in the present invention may be selected from commercial products available typically under the trade names of: PEP-8, PEP-8W, PEP-36/36A, HP-10, 2112, 2112RG, and 1178 (each from ADEKA CORPORATION).

The curable composition may contain the antioxidant (D) in a proportion of typically 0.1 to 10.0 parts by weight, preferably 0.5 to 5.0 parts by weight, and particularly preferably 0.5 to 3.0 parts by weight, per 100 parts by weight of the weight of a curable compound (in particular, a cationically curable compound) contained in the curable composition. When the curable composition contains two or more different curable compounds, the term "weight" refers to the total weight of them. When the curable composition contains two or more different antioxidants, the term "proportion" refers to the total proportion of them.

The curable composition may contain any of colorants. The colorants (or coloring agents) include pigments and dyes. The curable composition may contain each of different colorants alone or in combination.

Examples of the pigments include inorganic pigments, organic pigments, and pigments each including an inorganic pigment and a coating of an organic material (such as a resin) disposed on the inorganic pigment. Non-limiting examples of the inorganic pigments include carbon black, chromium oxide, iron oxides, black titanium oxide, acetylene black, lampblack, bone black, graphite, iron black, copper chrome black, copper iron manganese black, chromium cobalt iron black, ruthenium oxide, graphite, fine particles of metals (such as aluminum), metal oxide fine particles, complex oxide fine particles, metal sulfide fine particles, and metal nitride fine particles. Non-limiting examples of the organic pigments include perylene black, cyanine black, aniline black, azo pigments, anthraquinone pigments, isoindolinone pigments, indanthrene pigments, indigo pigments, quinacridone pigments, dioxazine pigments, tetraazaporphyrin pigments, triarylmethane pigments, phthalocyanine pigments, perylene pigments, benzimidazolone pigments, and rhodamine pigments.

Non-limiting examples of the dyes include azo dyes, anthraquinone dyes (such as Acid Violet 39, Acid Violet 41, Acid Violet 42, Acid Violet 43, Acid Violet 48, Acid Violet 51, Acid Violet 34, Acid Violet 47, Acid Violet 109, Acid Violet 126, Basic Violet 24, Basic Violet 25, Disperse Violet 1, Disperse Violet 4, Disperse Violet 26, Disperse Violet 27, Disperse Violet 28, Disperse Violet 57, Solvent Violet 11, Solvent Violet 13, Solvent Violet 14, Solvent Violet 26, Solvent Violet 28, Solvent Violet 31, Solvent Violet 36, Solvent Violet 37, Solvent Violet 38, Solvent Violet 48, Solvent Violet 59, Solvent Violet 60, Vat Violet 13, Vat Violet 15, and Vat Violet 16), indigo dyes, carbonyl dyes, xanthene dyes, quinonimine dyes, quinoline dyes, tetraazaporphyrin dyes, triarylmethane dyes, naphthoquinone dyes, nitro dyes, phthalocyanine dyes, fluoran dyes, perylene dyes, methine dyes, and rhodamine dyes.

The curable composition may contain the colorant in a content of typically about 10 to about 300 ppm of the total amount of the curable composition, where the content can be adjusted as appropriate according to the intended use. The lower limit of the content is preferably 50 ppm, and particularly preferably 100 ppm. When the curable composition contains two or more different colorants, the term "content" refers to the total content of them.

The curable composition may be prepared typically by stirring and mixing the above-mentioned components with each other in predetermined proportions, and, as needed, debubbling the resulting mixture in a vacuum.

The curable composition has a low viscosity and can be charged into a mold satisfactorily. The curable composition has a viscosity of typically 0.01 to 10.00 Pa·s, preferably 0.1 to 5.0 Pa·s, and particularly preferably 0.1 to 1.0 Pa·s as measured at 25° C. and a shear rate of 20 (1/s). The viscosity can be measured typically using a rheometer (trade name PHYSICA UDS200, supplied by Anton Paar GmbH).

In addition, the curable composition has excellent curability and, when subjected to at least one of light irradiation and heat treatment, can be cured rapidly to form a cured product.

The cured product has excellent mechanical strengths. For example, the cured product, when being obtained by curing in the method described in working examples to have a thickness of 1 mm, has a flexural modulus of typically 2.5 GPa or more, preferably 2.6 GPa or more, and particularly preferably 2.7 GPa or more, where the flexural modulus is measured in conformity with JIS K 7171:2008, except performing measurement on a test specimen having a length of 20 mm, a width of 2.5 mm, and a thickness of 0.5 mm at a span between specimen supports of 16 mm. The upper limit of the flexural modulus is typically about 3.8 GPa.

The cured product has excellent heat resistance and can maintain its shape even when subjected to the heat test described in the working examples. The molded article according to the present invention, which includes the cured product, can be mounted on (packaged in) a substrate by reflow soldering.

Method for Producing Molded Article

The molded article according to the present invention can be produced by subjecting the curable composition to cast molding (casting).

The molded article according to the present invention can be produced typically in the following manner. Specifically, a curable composition 6a is charged into a concavity 5 of a drag (lower die) 4, subjected to at least one of light irradiation and heat treatment while being covered with a cope (upper die) 7, and yields a molded article 6b (i.e., a cured product of the curable composition 6a) having a shape corresponding to the concavity of the mold (see FIG. 5).

Non-limiting examples of the mold for use in cast molding include a mold having one concavity having a reversed shape with respect to the target molded article; and an array mold having two or more of the concavity. The two or more concavities may be disposed randomly or spaced uniformly. In particular, an array mold is preferably used in the present invention for the production of the molded article in volume with better production efficiency.

The molded article according to the present invention is particularly preferably produced through the following steps 1, 2, and 3.

In the step 1, a photocurable composition containing an epoxy compound (A) is charged into a transparent array mold.

In the step 2, the photocurable composition is irradiated with light to give an array of molded articles.

In the step 3, the array of molded articles is separated into individual molded articles.

Non-limiting examples of techniques for charging the photocurable composition into the transparent array mold in the step 1 include a technique using a dispenser; screen process printing; curtain coating; and spraying. The photocurable composition for use in the present invention has excellent fluidity (flowability), has high chargeability, and can give a molded article that has excellent mold shape transferability (namely, excellent reproducibility of the mold concavity shape). The transparent array mold may include two or more parts such as a drag and a cope. The transparent array mold may have been subjected to a surface release treatment (such as coating with a mold release agent) in advance.

The step 2 is the step of curing the photocurable composition. The light (actinic radiation) for use in light irradiation can be any light such as infrared rays, visible light, ultraviolet rays, X rays, electron beams, alpha rays, beta rays, and gamma rays. Among them, ultraviolet rays are preferably employed in the present invention, because of excellent handleability. Irradiation with such ultraviolet rays can be performed typically using any of UV-LEDs (with wavelengths of 350 to 450 nm, and preferably 350 to 400 nm), high-pressure mercury lamps, ultra-high pressure mercury lamps, xenon lamps, carbon arc, metal halide lamps, sunlight, and laser systems. The photocurable composition, as having excellent curability, can undergo a curing reaction rapidly even by irradiation with light from a UV-LED.

When ultraviolet irradiation is performed, of light irradiation conditions, the integrated irradiance is preferably adjusted at typically 5000 mJ/cm$^2$ or less (e.g., 2500 to 5000 mJ/cm$^2$).

After light irradiation, demolding is performed to give an array of molded articles. Where necessary, the resulting article(s) may be subjected to post baking (such as heating at 80° C. to 180° C. for 5 to 30 minutes) before or after demolding.

The array of molded articles is a structure including two or more molded articles bonded to each other through linkage portions. The step 3 is the step of cutting the array of molded articles at the linkage portions. Namely, the step 3 is a dicing step (see FIG. 6). The cutting is performed using a cutting means (cutting device) such as a dicing blade.

The method according to the present invention for producing a molded article enables integral molding of a molded article having a high thickness deviation ratio and including a thin wall portion. The resulting molded article has a high thickness deviation ratio, includes a thin wall portion, and offers excellent mechanical strengths and a beautiful appearance. In addition, the method according to the present invention for producing a molded article enables volume production of the molded article efficiently. The method according to the present invention for producing a molded article is therefore advantageous as a method for producing specially-shaped molded articles (in particular, Fresnel lenses) having a light condensing or light diffusing effect. Non-limiting examples of the molded articles include camera flash lenses in portable electronic devices such as cellular phones, smartphones, and tablet personal computers; and lenses or prisms for use in on-vehicle electronic devices.

Molded Article

The molded article according to the present invention, which is obtained by the production method, is a molded article including a cured product of the curable composition, where the cured product has excellent mechanical strengths. The molded article has a thickness deviation ratio (thickest portion thickness to thinnest portion thickness ratio) of 5 or more (preferably 5 to 15, and particularly preferably 7 to 12) and has such a shape as to offer a light condensing or light diffusing effect.

The molded article may have a thinnest portion thickness (thickness at the thinnest portion) of typically 0.2 mm or less, preferably 0.05 to 0.2 mm, and particularly preferably 0.1 to 0.2 mm.

The molded article may have a thickest portion thickness (thickness at the thickest portion) of typically 0.5 mm or more, preferably 0.5 to 2.0 mm, and particularly preferably 0.8 to 2.0 mm.

The molded article according to the present invention offering a light condensing or light diffusing effect is preferably selected from camera flash lenses in portable electronic devices such as cellular phones, smartphones, and tablet personal computers; and lenses or prisms (in particular, Fresnel lenses; see FIGS. 1, 2, and 3) for use in on-vehicle electronic devices.

A "Fresnel lens" is a lens including two or more prisms disposed stepwise, where each prism includes a lens surface 1 and a non-lens surface 2 and has an angle cross-section, as described typically in JP-A No. 2014-38349, JP-A No. 2012-128106, JP-A No. 2013-137442, JP-A No. H04-127101, JP-A No. 2002-264140, Japanese Patent No. 2610029, JP-A No. H09-141663, and JP-A No. H06-11769. The angle 6 formed between the lens surface 1 and a reference plane 3 continuously decreases (or increases) toward the center. When the lens surfaces 1 alone are viewed continuously, the Fresnel lens forms one convex lens or one concave lens (see FIG. 4).

The molded article according to the present invention has excellent heat resistance and can therefore maintain the special shape even when subjected to a board assembly process in which soldering (in particular, lead-free soldering) is performed using a reflow oven. In addition, the molded article can be used in on-vehicle electronic devices, which require heat resistance.

The molded article according to the present invention is an integrally molded article, less suffers from generation of weld lines, and thereby has excellent mechanical strengths and a beautiful appearance.

Optical Device

The optical device according to the present invention includes the molded article. Examples of the optical device include, but are not limited to, portable electronic devices such as cellular phones, smartphones, and tablet personal computers; and on-vehicle electronic devices such as near-infrared sensors, millimeter wave radars, LED spotlighting devices, near-infrared LED lighting devices, mirror monitors, meter panels, head-mounted display (projection type) combiners, and head-up display combiners. The molded article has such sufficient heat resistance as to undergo board assembly by reflow soldering. The optical device according to the present invention can be produced efficiently and inexpensively, because the molded article can be mounted or packed collectively with other components by a reflow process without the need for being mounted in another step or process.

EXAMPLES

The present invention will be illustrated in further detail with reference to several examples below. It should be noted, however, that the examples are by no means intended to limit the scope of the present invention.

Production Example 1: Production of (3,4,3',4'-Diepoxy)Bicyclohexyl (a-1)

A dehydration catalyst was prepared by stirring and mixing 70 g (0.68 mol) of 95 weight percent sulfuric acid and 55 g (0.36 mol) of 1,8-diazabicyclo[5.4.0]undecene-7 (DBU) with each other.

A 3-L flask equipped with a stirrer, a thermometer, and a distillation pipe packed with a dehydrating agent and thermally kept (thermally insulated) was charged with 1000 g (5.05 mol) of hydrogenated biphenol (4,4'-dihydroxybicyclohexyl), 125 g (0.68 mol in terms of sulfuric acid) of the above-prepared dehydration catalyst, and 1500 g of pseudocumene, followed by heating. Water production was observed from around the time point when the internal temperature exceeded 115° C. Heating was further continued to raise the temperature up to the boiling point of pseudocumene (internal temperature: 162° C. to 170° C.), followed by dehydration at normal atmospheric pressure. The by-produced water was distilled off and discharged through a dehydration tube to the outside of the system. The dehydration catalyst was liquid and finely dispersed in the reaction mixture (reaction liquid) under the reaction conditions. An approximately stoichiometric amount (180 g) of water was distilled after a lapse of 3 hours, and this was defined as reaction completion. The reaction mixture upon the reaction completion was subjected to distillation using an Oldershaw distilling column including 10 plates to distill off pseudocumene, was further subjected to distillation at an internal temperature of 137° C. to 140° C. and an internal pressure of 10 Torr (1.33 kPa), and yielded 731 g of bicyclohexyl-3,3'-diene.

Into a reactor, 243 g of the prepared bicyclohexyl-3,3'-diene and 730 g of ethyl acetate were charged, and 274 g of a 30 weight percent solution (moisture content: 0.41 weight percent) of peracetic acid in ethyl acetate were added dropwise over about 3 hours while nitrogen was blown into the gas phase and the internal temperature of the reaction system was controlled to 37.5° C. After the completion of the dropwise addition, aging was performed at 40° C. for one hour, and the reaction was completed. The crude mixture upon the reaction completion was washed with water at 30° C., from which low-boiling compounds were removed at 70° C. and 20 mmHg, and yielded 270 g of a reaction product. The reaction product had an oxirane oxygen content of 15.0 weight percent.

A $^1$H-NMR measurement reveealed that a peak at δ of around 4.5 to 5 ppm, derived from an internal double bond, disappeared; and that a proton peak at δ of around 3.1 ppm, derived from epoxy, was formed. This demonstrated that the reaction product is (3,4,3',4'-diepoxy)bicyclohexyl.

Production Example 2: Production of Bis(3,4-Epoxycyclohexylmethyl) Ether (a-2)

Sodium hydroxide (granular) (499 g, 12.48 mol) and toluene (727 mL) were charged into a 5-L reactor. After nitrogen purge, a solution of tetrahydrobenzyl alcohol (420 g, 3.74 mol) in toluene (484 mL) was added, followed by aging at 70° C. for 1.5 hours. Next, tetrahydrobenzyl methanesulfonate (419 g, 2.20 mol) was added, the resulting mixture was aged under reflux for 3 hours, cooled down to room temperature, and combined with water (1248 g) to stop the reaction, followed by separation. A separated organic layer was concentrated, subjected to distillation under reduced pressure, and yielded ditetrahydrobenzyl ether as a colorless, transparent liquid in a yield of 85%. The $^1$H-NMR spectrum of the prepared ditetrahydrobenzyl ether was measured.

$^1$H-NMR (CDCl$_3$): δ 1.23-1.33 (m, 2H), 1.68-1.94 (m, 6H), 2.02-2.15 (m, 6H), 3.26-3.34 (m, 4H), 5.63-7.70 (m, 4H)

The prepared ditetrahydrobenzyl ether (200 g, 0.97 mol), a 20 weight percent solution of SP-D (in acetic acid) (0.39 g), and ethyl acetate (669 mL) were placed in a reactor, followed by heating up to 40° C. Next, a 29.1 weight percent solution (608 g) of peracetic acid in ethyl acetate was added dropwise over 5 hours, followed by aging for 3 hours. The organic layer was washed with an alkaline aqueous solution three times, and with ion-exchanged water two times, subjected to distillation under reduced pressure, and yielded bis(3,4-epoxycyclohexylmethyl) ether as a colorless, transparent liquid in a yield of 77%.

Examples 1 to 6 and Comparative Examples 1 to 3

Components described in Table 1 below were blended according to given formulations (in part by weight), stirred and mixed at room temperature using a planetary centrifugal mixer, and yielded uniform, transparent curable compositions.

The prepared curable compositions, and cured products of the curable compositions were evaluated in the following manner.

Viscosity Measurement

The viscosity (Pa·s) of each curable composition was measured at a temperature of 25° C. and a shear rate of 20 (1/s) using a rheometer (trade name PHYSICA UDS200, supplied by Anton Paar GmbH).

Flexural Modulus Evaluation

Spacers having a length of 30 mm, a width of 20 mm, and a thickness of 0.5 mm were prepared from Teflon®, and sandwiched between a pair of glass slides (trade name S2111, supplied by Matsunami Glass Ind., Ltd.). The glass slides had been immersed in a surface release treatment (trade name Optool HD1000, supplied by Daikin Industries, Ltd.) and then left stand in a chemical hood for 24 hours, before use.

The curable compositions prepared in the examples and the comparative examples were each cast into a mold, irradiated with light using a UV-LED (trade name ZUV-C20H, supplied by OMRON Corporation), and yielded cured products. The light irradiation was performed at a wavelength of 365 nm, an irradiation intensity of 50 to 100 mW/cm², and an integrated irradiance of 2500 to 5000 mJ/cm².

The prepared cured products were processed into test specimens having a length of 20 mm, a width of 2.5 mm, and a thickness of 0.5 mm. The test specimens were subjected to flexural modulus measurement using a tensile/compression tester (trade name RTF1350, supplied by A & D Company, Limited) in conformity with JIS K7171:2008, except for performing measurement at a constant span between specimen supports of 16 mm.

Evaluation of Thickness Deviation Ratio and Mold Shape Transferability

The curable compositions prepared in the examples and the comparative examples were each charged into a concavity of a transparent drag, covered with a transparent cope, irradiated with light using a UV-LED (trade name ZUV-C20H, supplied by OMRON Corporation), demolded, and yielded molded articles (see FIG. 5). The light irradiation was performed at a wavelength of 365 nm, an irradiation intensity of 50 to 100 mW/cm², and an integrated irradiance of 2500 to 5000 mJ/cm².

The thickest portion and the thinnest portion of each of the prepared molded articles were observed using a CCD camera (trade name VH-Z20UR, supplied by Keyence Corporation) to measure a thickest portion thickness (H) and a thinnest portion thickness (h), on the basis of which a thickness deviation ratio (H/h) was calculated. In addition, the mold shape transferability was evaluated according to criteria below.

Evaluation Criteria

Good transferability (Good): the molded article has a shape identical to the concavity shape of the drag; and Poor transferability (Poor): the molded article is significant damaged, or the molded article has a shape different from the concavity shape of the drag.

Heat Resistance Evaluation

Molded articles were prepared by a procedure as in the evaluation of thickness deviation ratio and mold shape transferability, and subjected to heat tests continuously three times according to the reflow temperature profile (maximum temperature: 270° C.) prescribed in JEDEC Standards using a table-top reflow oven (supplied by SHINAPEX CO., LTD.).

The molded articles after the heat tests were subjected to measurements of a thickest portion thickness (H') and a thinnest portion thickness (h') by a procedure as in the evaluations of the thickness deviation ratio and mold shape transferability, on the basis of which a thickness deviation ratio (H'/h') and mold shape transferability were evaluated.

TABLE 1

| | | Example 1 | Example 2 | Example 3 | Example 4 | Example 5 | Example 6 | Com. Ex. 1 | Com. Ex. 2 | Com. Ex. 3 |
|---|---|---|---|---|---|---|---|---|---|---|
| Curable compound | a-1 | 30 | 30 | 30 | | | 30 | | | |
| | a-2 | | | | 30 | | | | | |
| | CELLOXIDE 2021P | 20 | 20 | 20 | 20 | 50 | 20 | | 30 | |
| | YL983U | 30 | | | 30 | | 30 | 70 | 40 | |
| | YX8000 | | 30 | 30 | | 30 | | | | |
| | OXT221 | 20 | 20 | 20 | 20 | 20 | 20 | 30 | 30 | |
| | IRR214K | | | | | | | | | 50 |
| | PETIA | | | | | | | | | 25 |
| | IBOA | | | | | | | | | 25 |
| Polymerization initiator | CPI-101A | 0.45 | 0.45 | 0.45 | 0.45 | 1 | | 0.45 | | |
| | CPI-100P | | | | | | | | 3 | |
| | c-1 | | | | | | 0.2 | | | |
| | Irgacure 184 | | | | | | | | | 3 |
| Antioxidant | Irganox 1010 | 1 | 1 | 1 | 1 | 1 | 1 | 1 | 1 | 1 |
| | HP-10 | 1 | 1 | 1 | 1 | 1 | 1 | 1 | 1 | |
| Viscosity (Pa·s) of curable composition | | 0.14 | 0.12 | 0.12 | 0.13 | 0.10 | 0.14 | 0.75 | 0.12 | 0.09 |
| Flexural modulus (GPa) | | 2.9 | 3.0 | 3.0 | 2.8 | 2.6 | 2.9 | 1.5 | 2.4 | 3.0 |
| Before heat test | H (mm) | 1.01 | 0.99 | 2.00 | 1.00 | 0.98 | 1.00 | Sample damage | 1.00 | 0.92 |
| | h (mm) | 0.20 | 0.09 | 0.19 | 0.20 | 0.19 | 0.20 | | 0.19 | 0.18 |
| | H/h | 5.05 | 11.00 | 10.52 | 5.00 | 5.16 | 5.00 | | 5.26 | 5.11 |
| | Mold transferability | Good | Good | Good | Good | Good | Good | | Good | Poor* |
| After heat test | H' (mm) | 1.01 | 0.99 | 2.00 | 1.00 | 0.98 | 1.00 | — | 0.98 | 0.91 |
| | h' (mm) | 0.20 | 0.09 | 0.19 | 0.20 | 0.19 | 0.20 | | 0.18 | 0.17 |
| | H'/h' | 5.05 | 11.00 | 10.52 | 5.00 | 5.16 | 5.00 | | 5.44 | 5.35 |
| | Mold transferability | Good | Good | Good | Good | Good | Good | | Poor | Poor |

*The curable composition according to Comparative Example 3 offered poor curability and gave a molded article which was significantly damaged upon demolding.

The components described in Table 1 are as follows.

Curable Compounds a-1: (3,4,3',4'-diepoxy)bicyclohexyl prepared in Production Example 1 a-2: bis(3,4-epoxycyclohexylmethyl) ether prepared in Production Example 2

CELLOXIDE 2021P: 3,4-epoxycyclohexylmethyl (3,4-epoxy)cyclohexanecarboxylate, trade name CELLOXIDE 2021P, supplied by Daicel Corporation YL983U: bisphenol-F diglycidyl ether, trade name YL983U, supplied by Mitsubishi Chemical Corporation YX8000: hydrogenated bisphenol-A diglycidyl ether, trade name YX8000, supplied by Mitsubishi Chemical Corporation OXT221: 3-ethyl-3{[(3-ethyloxetanyl)methoxy]methyl}oxetane, trade name ARON OXETANE OXT-221, supplied by Toagosei Co., Ltd.

IRR214K: a diacrylate having a dicyclopentadiene skeleton, trade name IRR214K, supplied by DAICEL-ALLNEX LTD.

PETIA: pentaerythritol (tri/tetra)acrylate, trade name PETIA, supplied by DAICEL-ALLNEX LTD.

IBOA: isobornyl acrylate, trade name IBOA-B, supplied by DAICEL-ALLNEX LTD.

Polymerization Initiators

CPI-101A: a cationic photoinitiator, a 50% solution of 4-(phenylthio)phenyldiphenylsulfonium hexafluoroantimonate in propylene carbonate, trade name CPI-101A, supplied by San-Apro Ltd.

CPI-100P: a cationic photoinitiator, a 50% solution of 4-(phenylthio)phenyldiphenylsulfonium hexafluorophosphate in propylene carbonate, trade name CPI-100P, supplied by San-Apro Ltd.

c-1: a cationic photoinitiator, 4-(phenylthio)phenyldiphenylsulfonium phenyltris(pentafluorophenyl)borate Irgacure 184: a radical photoinitiator, 1-hydroxy-cyclohexyl phenyl ketone, trade name Irgacure 184, supplied by BASF SE Antioxidants Irganox 1010: pentaerythritol tetrakis[3-(3,5-di-t-butyl-4-hydroxyphenol)propionate], trade name Irganox 1010, supplied by BASF SE HP-10: 2,2'-methylenebis(4, 6-di-t-butylphenyl)ethylhexyl phosphite, trade name HP-10, supplied by ADEKA CORPORATION

REFERENCE SIGNS LIST 1 lens surface
2 non-lens surface
3 reference plane
4 drag
5 drag concavity
6a curable composition
6b molded article (i.e., cured product of curable composition)
7 cope
8 cutting line
9 array of molded articles
10 individual molded article obtained by separation

INDUSTRIAL APPLICABILITY

The molded article according to the present invention is a molded article having such a shape as to offer a light condensing or light diffusing effect. The molded article has mold transferability, mechanical strengths, and heat resistance at excellent levels and has a thickness deviation ratio of 5 or more. The molded article is thereby ready for decrease in size and increase in functionality of an optical device including the molded article. The molded article according to the present invention has excellent heat resistance and can be subjected, together with other components, to board assembly (board level packaging) by reflow soldering (in particular, by lead-free soldering) without the need for another process for assembly. This enables the production of an optical device including the molded article with excellent working efficiency. In addition, the molded article is usable even in on-vehicle electronic devices, which require heat resistance.

The invention claimed is:
1. A molded article comprising
a cured product of a curable composition comprising an epoxy compound (A), an oxetane compound (B), and a cationic-polymerization initiator (C),
wherein the epoxy compound (A) comprises
a compound represented by Formula (a):

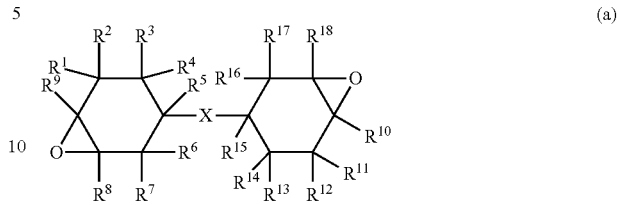

wherein $R^1$ to $R^{18}$ are each, identically or differently, selected from hydrogen, halogen, a hydrocarbon group optionally containing oxygen or halogen, and optionally substituted alkoxy; and X is a linkage group including ester bond,
wherein the oxetane compound (B) comprises oxetane compounds represented by Formula (b):

where $R^a$ represents a monovalent organic group; $R^b$ is selected from hydrogen and ethyl; and m represents an integer of 0 or more,
the cured product having a flexural modulus of 2.5 GPa or more, wherein the flexural modulus is measured in conformity with JIS K 7171:2008, except for being measured on a test specimen having a length of 20 mm, a width of 2.5 mm, and a thickness of 0.5 mm at a span between specimen supports of 16 mm,
the molded article having a thickness deviation ratio (thickest portion thickness to thinnest portion thickness ratio) of 5 or more,
the molded article having a light condensing or light diffusing effect, and
wherein the molded article is a lens.
2. The molded article according to claim 1, which has a thickness at the thinnest portion of 0.2 mm or less.
3. The molded article according to claim 2, which has a thickness at the thickest portion of 0.5 mm or more.
4. The molded article according to claim 1, which is a Fresnel lens.
5. An optical device comprising
the molded article according to claim 1.
6. A method for producing a molded article, the method comprising
subjecting a curable composition comprising an epoxy compound (A) to cast molding, to yield the molded article according to claim 1.
7. The method according to claim 6 for producing a molded article, the method comprising the steps of:
1) charging a photocurable composition as the curable composition comprising the epoxy compound (A) into a transparent array mold;
2) irradiating the photocurable composition with light to give an array of molded articles; and 3) separating the array of molded articles into individual molded articles.

8. The method according to claim 7 for producing a molded article, wherein the light irradiation is performed using a UV-LED with a wavelength of 350 to 450 nm.

9. The method according to claim 7 for producing a molded article,
   wherein the light irradiation is performed at an integrated irradiance of 5000 mJ/cm$^2$ or less.

* * * * *